(12) United States Patent
Bentley

(10) Patent No.: US 6,352,060 B1
(45) Date of Patent: Mar. 5, 2002

(54) VARIABLE TIMING POPPET VALVE APPARATUS

(76) Inventor: Paul Jospeh Bentley, 16 Queens Road, Asquith, New South Wales 2207 (AU)

( * ) Notice: Subject to any disclaimer, the term of this patent is extended or adjusted under 35 U.S.C. 154(b) by 0 days.

(21) Appl. No.: 09/674,591

(22) PCT Filed: May 3, 1999

(86) PCT No.: PCT/AU99/00325

§ 371 Date: Jan. 16, 2001

§ 102(e) Date: Jan. 16, 2001

(87) PCT Pub. No.: WO99/57422

PCT Pub. Date: Nov. 11, 1999

(30) Foreign Application Priority Data

May 4, 1998 (AU) .............................................. PP3309

(51) Int. Cl.$^7$ ........................... F01L 1/344; F02D 13/02
(52) U.S. Cl. ................................ 123/90.15; 123/90.17; 123/90.31; 123/90.39
(58) Field of Search ........................... 123/90.15, 90.16, 123/90.17, 90.31, 90.39

(56) References Cited

U.S. PATENT DOCUMENTS

| | | | | | |
|---|---|---|---|---|---|
| 4,535,733 A | * | 8/1985 | Honda | ...................... | 123/90.17 |
| 5,178,105 A | * | 1/1993 | Norris | ...................... | 123/90.15 |
| 5,586,527 A | * | 12/1996 | Kreuter | .................... | 123/90.15 |
| 5,592,906 A | * | 1/1997 | Kreuter et al. | ........... | 123/90.16 |
| 5,832,886 A | * | 11/1998 | Grob et al. | ............... | 123/90.17 |

FOREIGN PATENT DOCUMENTS

DE          24 56 752     *   8/1976

* cited by examiner

*Primary Examiner*—Weilun Lo
(74) *Attorney, Agent, or Firm*—Greer, Burns & Crain, Ltd.

(57) ABSTRACT

A valve actuating apparatus for at least two valves of an internal combustion engine having a drive means for rotating at least two camshafts each of which actuate a rocker assembly which in turn actuates said valve. The drive means comprising a drive gear operably rotated by the engine crankshaft and operably engaged with two driven gears each of which is mounted on a respective one of the at least two camshafts. Each of the driven gears are adapted to be slidably moved along their respective camshafts by a servo means.

10 Claims, 4 Drawing Sheets

VARIABLE TIMING POPPET VALVE APPARATUS

TECHNICAL FIELD

This invention relates to an apparatus and method for varying the timing and duration of both inlet and exhaust poppet valves of a combustion cylinder of an internal combustion engine.

BACKGROUND

Due to fuel specifications the majority of post 1976 motor vehicle internal combustion engines require retarded intake valve timing to lower the physical compression to prevent "preignition". The problem of preignition typically occurs is when the heat and compression in a combustion cylinder reaches a point in front of the burning air/fuel mixture such that an explosion takes place that is undesired to other internal components. In recent years the octane level in petroleum has been lowered which has compounded the preignition problem.

Two disadvantages associated with retarded valve timing to avoid preignition are "gas reflux" and a decline in low speed torque. Gas reflux is a problem that occurs at low rotational speeds of an engine. At low rotational speeds the pressure in the combustion chamber is higher than that of the intake tract (inlet manifold) which interrupts the gas flow inertia "ramming effect", In order to overcome this problem engine manufacturers have had to increase the idle speed to ensure a smooth engine idle. This in turn creates a problem with an increase in fuel consumption and exhaust emissions and engine wear.

Manufacturers have developed camshafts with the retarded intake valve timing to reduce physical compression in order control the problem of preignition. Such known camshafts have compromised engine performance.

During the operation of a combustion cylinder of an internal combustion engine, "dwell" occurs between the point the camshaft actuates the valve to open and the point it allows the valve to close. "Valve overlap period", also known as "valve overlap angle" is the sequence at which both inlet and exhaust valves are open during a rotational cycle of the engine. "Duration" is the period the valve remains open. High performance engines require a large "dwell" and "valve overlap period" to allow more time for the piston to draw in a significant amount of air and fuel at high crankshaft speeds, but at lower speeds "gas reflux" retards the performance of the engine. Low speed torque requires a reduced dwell and valve overlap period to lower gas reflux. It also requires that the intake valve closure occurs early on the compression stroke of the cylinder to increase physical compression.

Several automotive manufacturers have developed variable valve timing mechanisms without variable "duration". A problem associated with variable valve timing without variable duration, is that as "dwell" remains constant, the point at which the valve opens equally effects the point of valve closing. This constant "dwell" effectively disadvantages some of the benefits gained from advancing or retarding the valve timing. This effect becomes more pronounced for an engine with one camshaft that actuates both the intake and exhaust valves.

Australian Patent No. 695596 (Bentley) discloses an apparatus for operating poppet valves, which allows for variability of the dwell, timing, duration and overlap. The apparatus comprises a means for rotating two camshafts, an inlet camshaft and an exhaust camshaft. The valve timing is varied by two sun gear sets each of which is associated with a respective camshaft and both of which are operably connected to a servomechanism. The servomechanism acts on an annulus operably connected to the planetary gear assembly. A disadvantage of this device is that the sun gear assemblies and servomechanism are located between the crankshaft and belt (or chain) hub(s), and operably engaged with an idler gear, thereby adding considerable complexity and expense to the apparatus.

It is an object of the invention to ameliorate the operation of an internal combustion engine.

SUMMARY OF INVENTION

In a first aspect the present invention consists of a valve actuating apparatus for at least two valves of an internal combustion engine, said apparatus comprising a drive means for rotating at least two camshafts each of which actuate a rocker assembly which in turn actuates said valves, said drive means comprising a drive gear to operably rotated by the engine crankshaft and operably engaged with two driven gears each of which is slidably mounted on a respective one of said at least two camshafts, wherein each of said driven gears are adapted to be slidably moved along their respective camshafts by a servo means.

In one embodiment said drive gear and said two driven gears are helical gears, and said slidable movement of said two driven gears along their respective camshafts is parallel to their respective axes of rotation.

In a second aspect the present invention consists of a valve actuating apparatus for at least two valves of an internal combustion engine, said apparatus comprising a drive means for rotating at least two camshafts each of which actuate a rocker assembly which in turn actuates said valves, said drive means comprising a helical drive gear operably rotated by the engine crankshaft and operably engaged with two helical driven gears each of which is slidably mounted on a respective one of said at least two camshafts, wherein each of said helical driven gears are adapted to be slidably moved along their respective camshafts by a servo means.

Preferably the servo means is operably controlled by an electronic control unit. Preferably said electronic control unit is operably connected to a number of engine sensor units which monitor engine parameters such as manifold air pressure, engine temperature, crankshaft angle(rotational position), camshaft angle(rotational position) and ignition.

Preferably the servo means comprises at least two servo units each of which is associated with a respective one of said helical driven gears.

Preferably each of said servo units is adapted to slidably move said helical driven gears independently of each other.

Preferably the two helical driven gears are each slidably mounted at or near respective ends of the camshafts by means of a spline.

In a third aspect the present invention consists of an internal combustion engine having at least one actuating apparatus for actuating at least two valves, said apparatus comprising a drive means for rotating at least two camshafts each of which actuate a rocker assembly which in turn actuates said valve, said drive means comprising a helical drive gear operably rotated by the engine crankshaft and operably engaged with two helical driven gears each of which is slidably mounted on a respective one of said at least two camshafts, wherein each of said helical driven gears are adapted to be slidably moved along their respective camshafts by a servo means.

The present invention preferably allows for variable valve timing and duration by changing one or more camshaft actuations of the valve to improve the torque, power output, fuel economy and exhaust emissions of the engine.

Preferably the present invention provides an improvement in "volumetric efficiency" by control of the valve operation. Volumetric efficiency is the measurement in percentage of the air/fuel mixture drawn into the combustion chamber during the intake cycle.

MODE OF CARRYING OUT INVENTION

Figure 1:
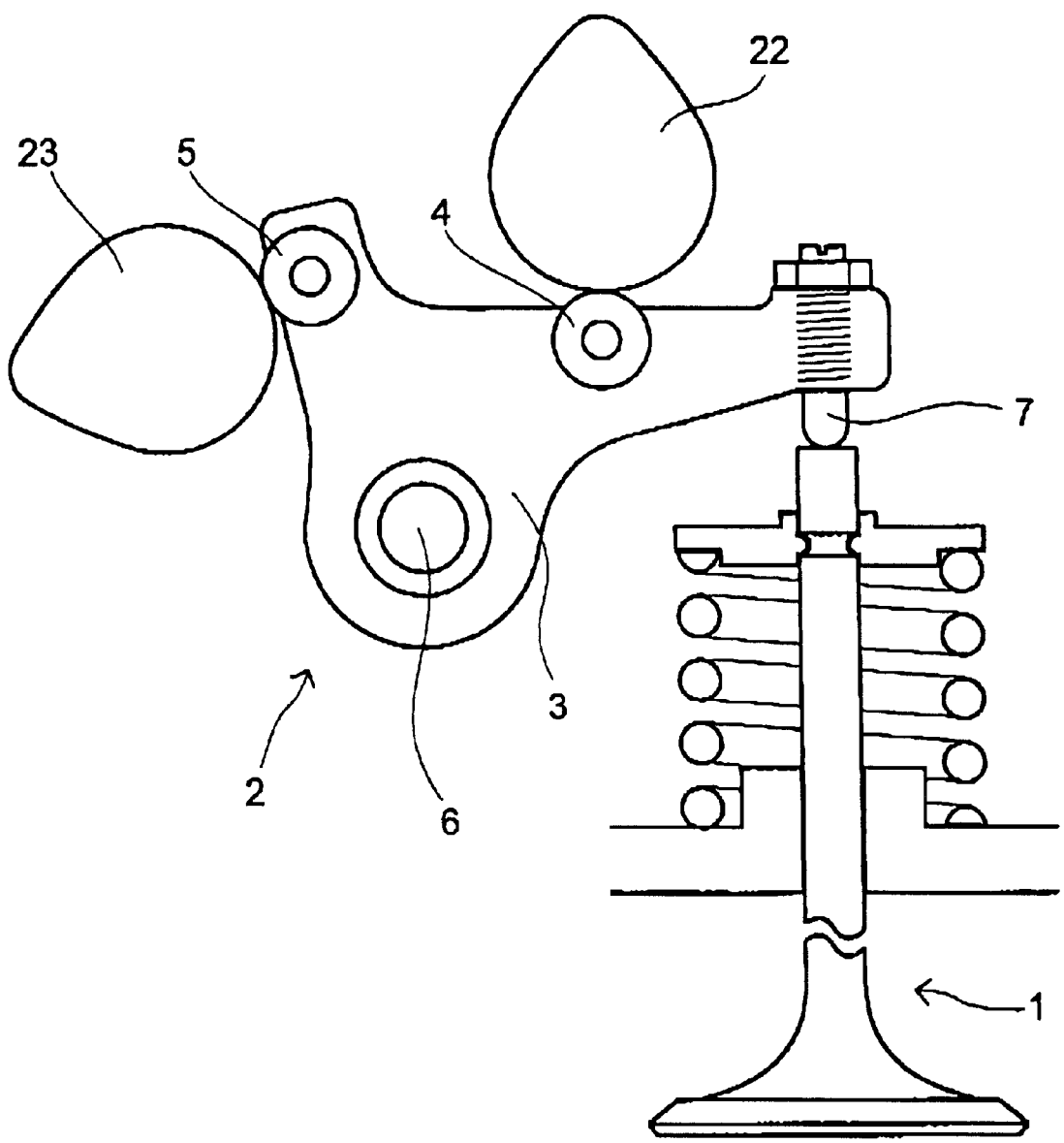
FIG. 1 is an elevational schematic view of a poppet valve/rocker mechanism and the two camshafts which actuate the rocker.

The actuation of an inlet poppet valve 1 by a rocker assembly 2 of an internal combustion engine is shown in FIG. 1. The rocker assembly 2 comprises a rocker 3 is and two lash pads (or rollers) 4 and 5. The rocker 3 pivots about a pivot point 6 allowing thrust pin 7 mounted on rocker 3 to actuate valve 1.

Figure 2:
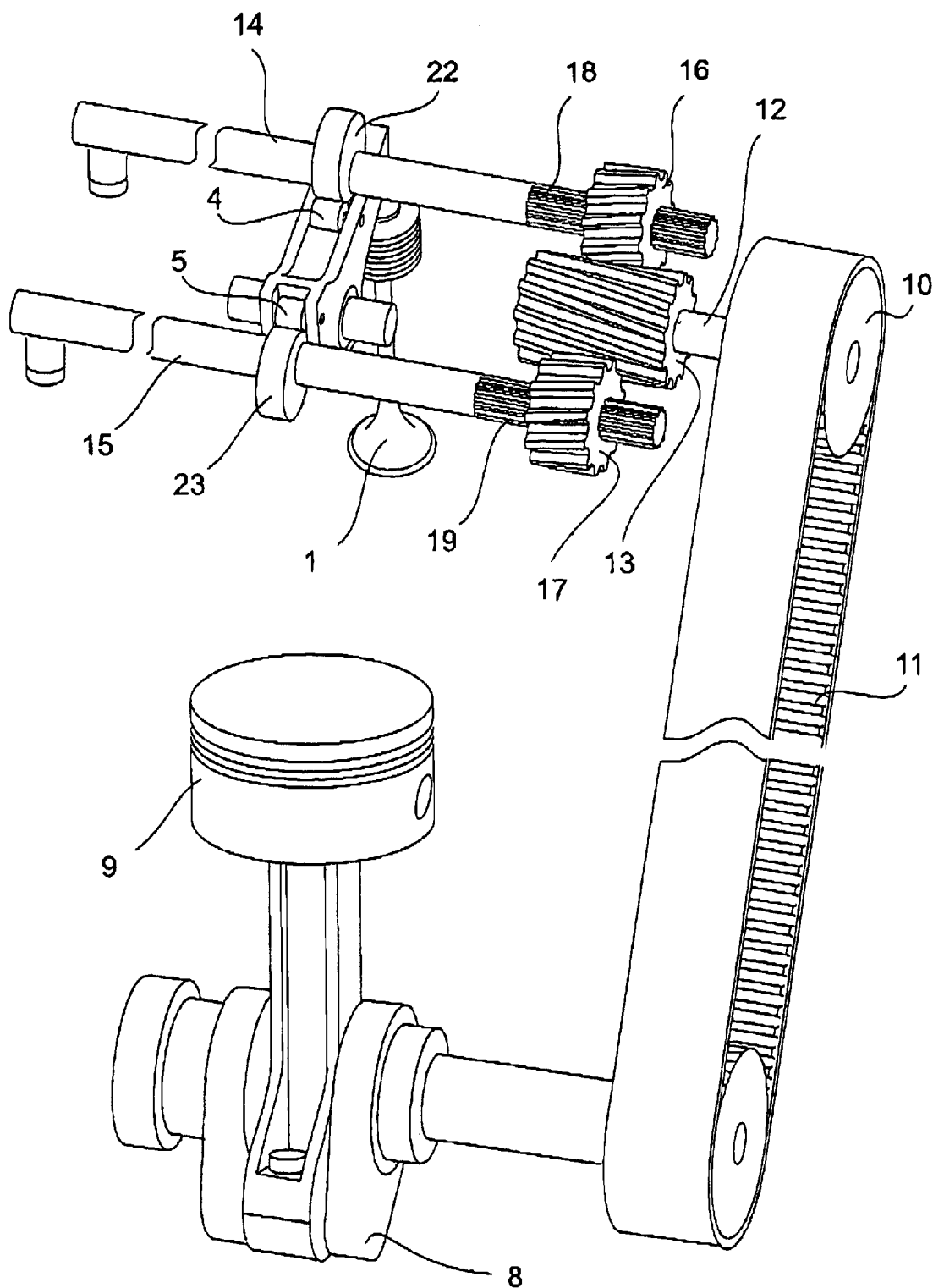
FIG. 2 is a perspective schematic view of an embodiment of an apparatus for operating poppet valves in accordance with the present invention.

FIG. 2 depicts the drive mechanism of the engine. The rotational drive means of the engine is a crankshaft 8 which is shown connected to a piston 9. For ease of reference the engine block, head and other fixtures are not shown. The rotational drive is imparted from the crankshaft 8 to a camshaft hub 10 via timed tooth belt 11, which could in other embodiments be a chain or gear drive. The camshaft hub 10 is connected via a shaft 12 to a helical drive gear 13, which is the drive gear for the two camshafts 14 and 15.

The phasing of camshafts 14 and 15 is in a timing sequence with the crankshaft 8. Helical driven gears 16 and 17 are each slidably mounted on respective splines 18 and 19, on respective ends of camshafts 14 and 15. Driven gears 16 and 17 being in engagement with drive gear 13. The variation of timing and duration of valve 1 is achieved by altering the axial position(s) of driven gears 16 and 17 along the respective straight splines 18,19, of camshafts 14 and 15 in a direction parallel to arrow A. relative to drive gear 13. The straight splines 18 and 19 ensure that driven gears 16 and 17 are able to be moved along a portion of the respective camshafts 14 and 15, whilst restricting radial motion therebetween.

Figure 3:
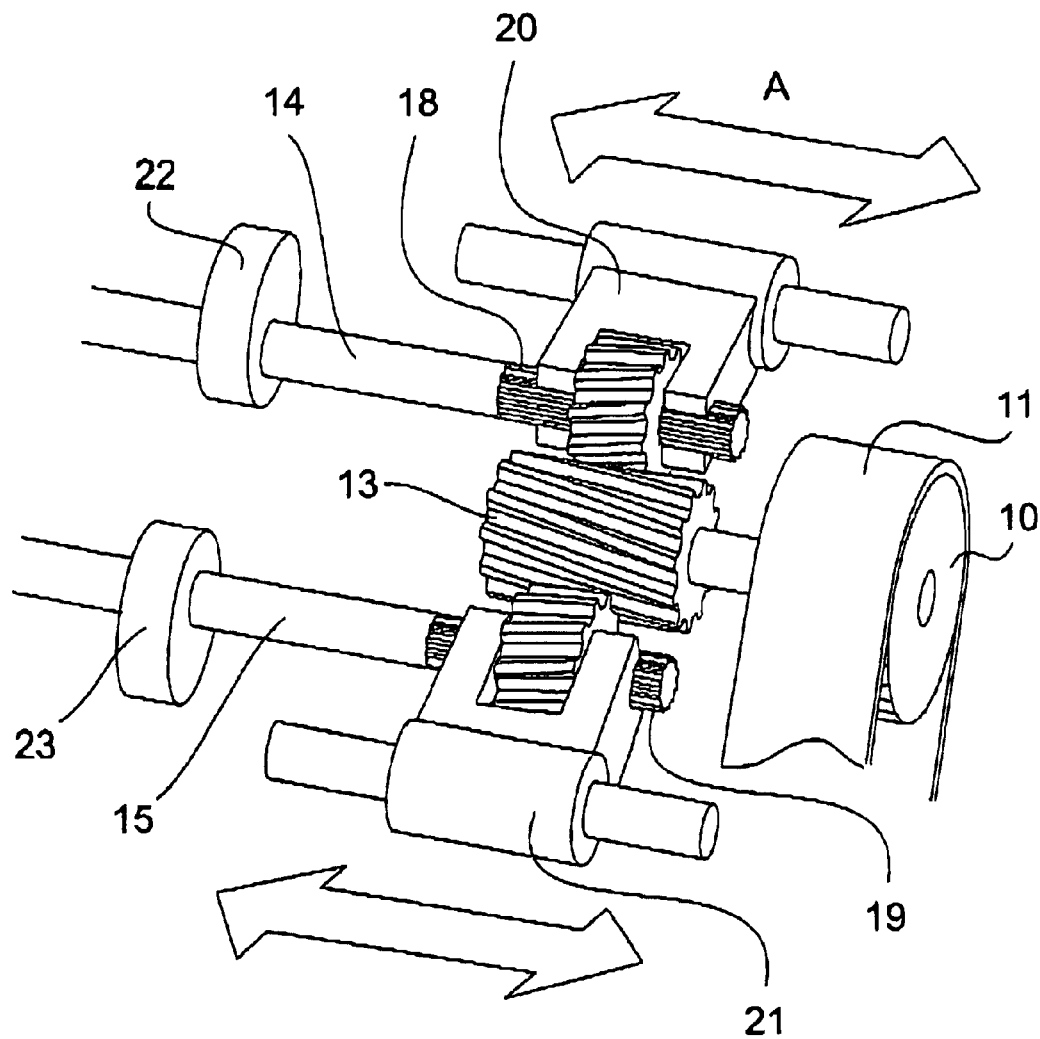
FIG. 3 is a perspective schematic view of servomechanisms in movable enagement with driven gears of the apparatus shown in FIG. 2.

The driven gears 16 and 17 may be slidably moved independently of each other by servomechanisms (or servo units) 20 and 21 respectively, as shown in FIG. 3. The servomechanisms 20 and 21 control positioning of driven gears 16 and 17 with respect to drive gear 13 which is in a constant timing phase with crankshaft 7. Altering the position of the driver gears 16 and 17 with respect to the drive gear 13 alters the phasing between the two camshafts 14 and 15. This is achieved by the opposed helix of the helical drive gear 13 with respect to the helix of helical driven gears 16 and 17. The helix of drive gear 13 is a right-hand helix, whilst the helixes of driven gears 16 and 17 are left-hand helixes. When the driven gears 16 and 17 are moved relative to drive gear 13, the opposed teeth angles cause the gears to rotate several degrees in comparison with each other. This allows for the positioning of camshafts 14 and 15, ie. advancement and retardment of camshafts 14 and 15, to be varied independently of is each other and of the crankshaft 8.

Figure 4:
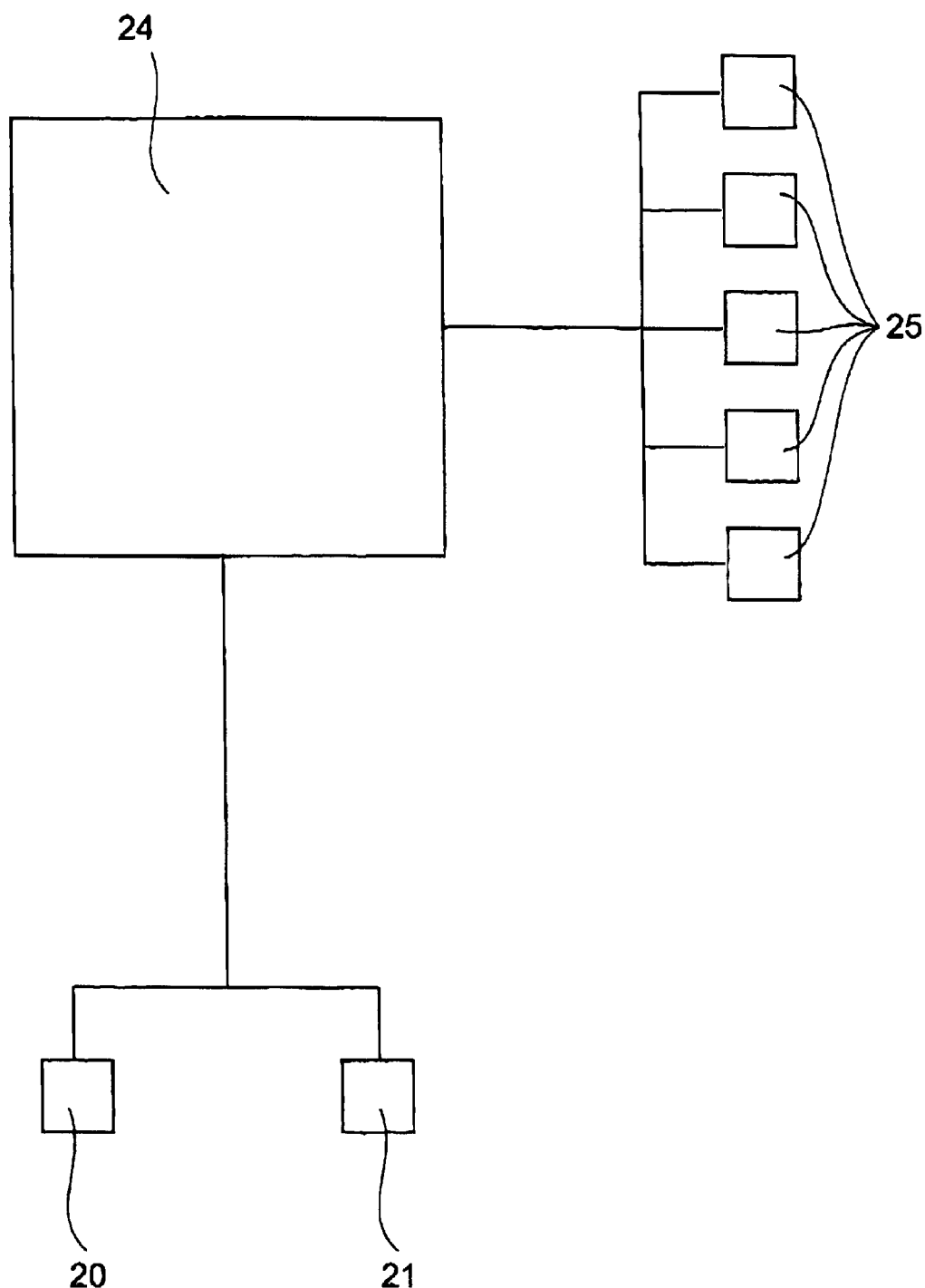
FIG. 4 is a schematic representation of the electronic control unit connected to the servomechanisms and sensors used to operably control the apparatus of the present invention.

As shown in FIG. 4 the servomechanisms 20 and 21 are controlled via an electronic control unit (ECU) 24, which is operably connected to a number of engine sensor units 25 which monitor parameters such as manifold air pressure, engine temperature, crankshaft angle(rotational position), camshaft angle(rotational position) and ignition. The ECU 24 may typically be of the kind used to control and monitor modern vehicle engines.

The advancement of camshaft 14 and retardment of camshaft 15 in relation to lash pads 4 and 5 results in an increase in duration. As the two camshafts 14,15 are rotating, the advanced camshaft 14 opens the valve 1 via rocker 3, and as lobe 22 comes off lash pad 4, the lobe 23 of the retarding camshaft 15 is still in contact with lash pad 5.

For a short duration the phasing of the two camshaft lobes 22 and 23 is such that they both come into contact with the respective lash pads 4 and 5, simultaneously and exit to allow the valve 1 to close in a minimum amount of dwell.

The same principle can be used to advance or retard the timing via the positioning of the driven gears 16 and 17 in relation to the drive gear 13.

The above mentioned embodiment has for simplicity been described with reference to the operable control of an inlet valve, however, it should be understood that the same principle can be used to operably control the timing and duration of an exhaust valve.

It should also be understood that whilst the above mentioned embodiment describes and shows a right-hand helix on helical drive gear 13 and left-hand helixes on helical so driven gears 16 and 17, it may be possible in another not shown embodiment to utilise a helical drive gear 13 with a left-hand helix with the helical driven gears 16 and 17 having right hand helixes.

In another not shown embodiment the helical drive gear 13 and driven gears 16 and 17 may be replaced by straight toothed gears and the straight splines 18 and 19 for mounting the driven gears 16,17 on camshafts 14 and 15 are replaced by helical splines. Movement of the straight driven gears along the helical splines by the servo mechanism would be radial as well as axial thereby allowing for movement of the camshafts to effect control of the valve timing, duration and overlap.

Whilst the servomechanisms of the above mentioned embodiment are operably controlled by an ECU, their operation may in an other embodiment be controlled or effected by hydraulic or mechanical means.

It should be understood that the shape and configuration of gears, camshafts, lobes servomechanisms and other components may differ without affecting the scope of the invention.

What is claimed is:

1. A valve actuating apparatus for at least two valves of an internal combustion engine, said apparatus comprising a drive means for rotating at least two camshafts each of which actuate a rocker assembly which in turn actuates said valves, said drive means comprising a drive gear operably rotated by the engine crankshaft and operably engaged with two driven gears each of which is slidably mounted on a respective one of said at least two camshafts, wherein each of said driven gears are adapted to be slidably moved along their respective camshafts by a servo means.

2. A valve actuating apparatus as claimed in claim 1, wherein said drive gear and said two driven gears are helical gears, and said slidable movement of said two driven gears along their respective camshafts is parallel to their respective axes of rotation.

3. A valve actuating apparatus as claimed in claim 1, wherein the servo means is operably controlled by an electronic control unit.

4. A valve actuating apparatus as claimed in claim 3, wherein said electronic control unit is operably connected to a number of engine sensor units adapted to monitor engine parameters.

5. A valve actuating apparatus as claimed in claim 4, wherein said engine parameters comprise manifold air pressure, engine temperature, crankshaft angle, camshaft angle and ignition.

6. A valve actuating apparatus as claimed in claim 1, wherein the servo means comprises at least two servo units each of which is associated with a respective one of said driven gears.

7. A valve actuating apparatus as claimed in claim 6, wherein each of said servo units is adapted to slidably move said helical driven gears independently of each other.

8. A valve actuating apparatus as claimed in claim 1, wherein the two helical driven gears are each slidably mounted at or rear respective ends of the camshafts by means of a spline.

9. A valve actuating apparatus as claimed in claim 1, wherein the rocker assembly is independent of said drive means.

10. An internal combustion engine having at least one actuating apparatus for actuating at least two valves, said apparatus comprising a drive means for rotating at least two camshafts each of which actuate a rocker assembly which in turn actuates said valves, said drive means comprising a helical drive gear operably rotated by the crankshaft of said engine and operably engaged with two helical driven gears each of which is slidably mounted on a respective one of said at least two camshafts, wherein each of said helical driven gears are adapted to be slidably moved along their respective camshafts by a servo means.

* * * * *